Dec. 3, 1929.  A. JORDAHL  1,738,249
AIR AND GAS FILTER
Filed May 8, 1924
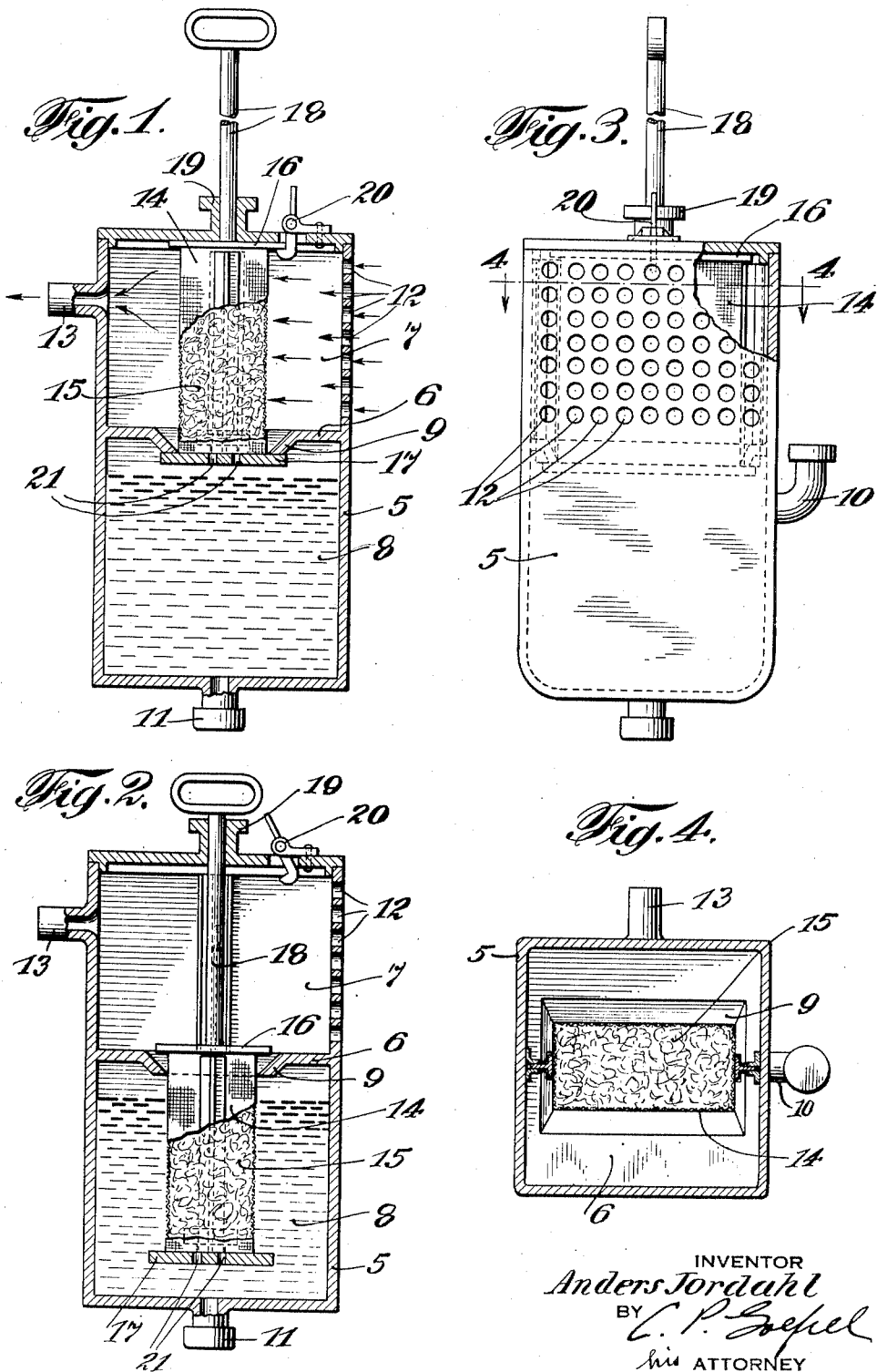
INVENTOR
Anders Jordahl
BY C. P. Goepel
his ATTORNEY Patented Dec. 3, 1929

1,738,249

UNITED STATES PATENT OFFICE

ANDERS JORDAHL, OF NEW YORK, N. Y.

AIR AND GAS FILTER

Application filed May 8, 1924. Serial No. 711,808.

This invention relates to air and gas filters, and has for its primary object and purpose to provide a very simply constructed filter for air and gases of the semi-dry type which may be advantageously employed for a variety of uses or purposes where a supply of air or gas free from particles of dust or other foreign matter carried in suspension thereby is required.

It is a more particular object of my invention to provide an air and gas filter wherein there is provided a rigid bodily movable filtering cell or unit adapted for movement from an operative position in the path of flow of the air or gas into a reservoir or container for the viscous liquid or other cleansing agent whereby the foreign matters collected on the surfaces of the filtering medium are washed and removed therefrom, and the film of viscous liquid on such surfaces renewed.

With the above and other objects in view, the invention consists in the improved air or gas filter, and in the form, construction and relative arrangement of its several parts as will be hereinafter more fully described, illustrated in the accompanying drawings and subsequently incorporated in the subjoined claims.

In the drawings, wherein I have illustrated one simple and practical embodiment of the invention, and in which similar reference characters designate corresponding parts throughout the several views,—

Figure 1 is a vertical sectional view through the filter showing the filter cell or unit disposed in its operative filtering position;

Fig. 2 is a similar view, showing the filter cell or unit displaced from its filtering position into the body of cleansing liquid;

Fig. 3 is a front side elevation partly broken away, and

Fig. 4 is a horizontal sectional view taken on the line 4—4 of Fig. 3.

In the form of the invention which I have selected for purposes of illustration, I provide a casing or housing 5 which may be of any suitable form and dimensions. This casing is internally divided by a horizontal partition wall 6 into an upper chamber 7 and the lower chamber 8. In the construction shown, this partition 6 is provided with an elongated opening surrounded by a downwardly and inwardly inclined flange 9, the purpose of which will be later explained.

The lower chamber 8 is adapted to contain a cleansing liquid, preferably more or less viscous which is supplied thereto through the inlet connection 10 to the upper end of said chamber, and this liquid may be drained from the bottom of the chamber through the outlet 11.

One of the walls of the upper chamber 7 is provided with suitably arranged air inlet openings 12 and the opposite wall of said chamber is provided with the air outlet indicated at 13 to which a connection may be made by a suitable tube or pipe for conveying the filtered air to the place of utilization.

The filter cell or unit as herein illustrated consists of a rectangular holder or container 14 for a suitable filtering medium indicated at 15, the body walls of this holder or container being formed of reticulated or perforate material having a substantially rigid structure and connecting the upper and lower heads or closures 16 and 17 respectively, with each other. To the upper head 16 of the filter cell the rod 18 is securely fixed at its lower end and is slidably engaged in a suitable guide 19 provided on the top wall or cover plate of the housing or casing 5, the upper end of said rod being provided with a suitable handle.

Suitable means is of course, provided whereby the passage of unfiltered air between the opposite side walls of the filter cell or unit and the opposed side walls of the housing 5 is prevented when the filter unit is in its operative position as seen in Fig. 1 of the drawings.

Upon the top wall or cover 19 of the housing 5, a latch member 20 is pivotally mounted and extends downwardly through an opening in the housing cover for engagement under the marginal edge of the closure head 16 of the filter cell or unit to sustain the same in its operative position. When this latch member is released from engagement with the part 16, the filter unit will then drop by gravity downwardly through the opening in the partition 6 and into the body of cleansing liquid contained in the chamber 8. When the filter cell or unit is raised from this position and secured by the latch member 20 in its operative filtering position, the marginal portions of the lower head 17 of said filter unit engage the flange 9 surrounding the openings in the partition 6 and thus seals communication between the upper chamber 7 and the lower chamber 8 of the casing so that the cleansing liquid may not, when agitated enter the upper chamber. The lower head member 17 of the filter unit is provided with one or more openings 21 therein through which the surplus liquid on the filtering medium 15 may readily drain back into the chamber 8. Also, any particles of liquid which might be carried off by the air and deposited in the upper chamber 7 will be directed to these openings 21 by the downwardly inclined flange 9. By means of the filter construction above described, it will be apparent that at predetermined time intervals, the filter unit may be released from its operative position and submerged in the cleaning liquid in the lower chamber of the housing, thus maintaining the filter medium at its highest efficiency. The dust laden air enters the upper chamber of the housing through the openings 12, and in passing through the filter cell or unit, all particles of dust and other foreign matter are removed therefrom and the air leaves the opposite side of the filter unit and passes through the outlet 13 in a thoroughly filtered condition.

I have herein described one embodiment of the invention, which will be entirely satisfactory in practical use. It is apparent of course, that the essential features of the invention may be embodied in numerous alternative structural forms, and I accordingly reserve the privilege of resorting to all such legitimate changes in the form, construction and relative arrangement of the various parts as may be fairly embodied within the spirit and scope of the invention as claimed.

What is claimed:—

1. An apparatus for cleaning air and other gases comprising a casing having a lower portion constituting a liquid holding reservoir and a gas inlet and an outlet in permanently fixed spaced relation to each other above said reservoir, a filter unit movable in said casing from the reservoir to an operable gas filtering position between the inlet and outlet, and means for substantially sealing communication between the reservoir and the gas outlet in the latter position of the filter unit.

2. An apparatus for cleaning air and other gases comprising a casing having gas inlet and outlet openings in its upper portion and a liquid reservoir in its lower portion, said gas inlet being in permanently fixed relation to said reservoir, a filter unit mounted within said casing and bodily movable in the line of its axis from the body of liquid in said reservoir to a position above said liquid and between said inlet and outlet openings.

3. An apparatus for cleaning air and other gases comprising a casing having gas inlet and outlet openings in its upper portion and a liquid holding reservoir in its lower portion, said gas inlet being in permanently fixed relation to said reservoir, a filter unit within said casing and means for manually moving the filter unit in the line of its axis from the body of liquid in the reservoir to a position wholly above the same and interposed between said gas inlet and outlet openings, and means for releasably retaining the filter unit in the latter position.

4. An apparatus for cleaning air and other gases comprising a casing having gas inlet and outlet openings in its upper portion and a liquid holding reservoir in its lower portion, a filter unit bodily movable in the line of its axis from the liquid in the reservoir to a position wholly above the same and interposed between said gas inlet and outlet openings, and means automatically substantially sealing communication between said reservoir and the upper part of the casing in the latter position of the filter unit.

5. An apparatus for cleaning air and gases comprising a liquid holding reservoir having an opening in a wall thereof, a filter unit movable from a submerged position in the liquid contained in said reservoir through said opening to an operative gas filtering position, and means for substantially sealing said opening in the latter position of the filtering unit.

6. An apparatus for cleaning air and other gases comprising a casing having a gas receiving chamber and a liquid holding reservoir and a separating partition therebetween provided with an opening, and a rigid filter unit bodily movable through said opening to submerge the same in the liquid in the reservoir or to position said unit wholly above the liquid and in the path of flow of the gas through said chamber.

7. An apparatus for cleaning air and other gases comprising a casing having a gas receiving chamber and a liquid holding reservoir and a separating partition therebetween provided with an opening, a filter unit bodily movable through said opening to submerge the same in the liquid in the reservoir or to position said unit in the path of flow of the gas through said chamber, and means carried by the filter unit automatically sealing the opening in said partition when the filter unit is moved to its operative position.

Signed at New York, in the county of New York and State of New York, this 7th day of May A. D. 1924.

ANDERS JORDAHL.